(12) United States Patent
Giraud

(10) Patent No.: US 8,322,567 B2
(45) Date of Patent: Dec. 4, 2012

(54) CONTAINERS WITH PILL DISPENSING FEATURE

(75) Inventor: Jean-Pierre Giraud, Paris (FR)

(73) Assignee: Capitol Plastic Products LLC, Amsterdam, NY (US)

( * ) Notice: Subject to any disclaimer, the term of this patent is extended or adjusted under 35 U.S.C. 154(b) by 1084 days.

(21) Appl. No.: 11/397,073

(22) Filed: Apr. 3, 2006

(65) Prior Publication Data

US 2007/0051739 A1 Mar. 8, 2007

Related U.S. Application Data

(63) Continuation-in-part of application No. PCT/US2004/032369, filed on Oct. 1, 2004.

(60) Provisional application No. 60/508,183, filed on Oct. 2, 2003, provisional application No. 60/510,888, filed on Oct. 14, 2003.

(51) Int. Cl.
*B65D 43/14* (2006.01)
*B65D 41/18* (2006.01)
*B65D 6/28* (2006.01)
*B65D 5/72* (2006.01)
*G07F 11/16* (2006.01)

(52) U.S. Cl. ....... 220/839; 220/4.23; 220/780; 220/793; 221/306; 221/310; 222/490

(58) Field of Classification Search .................. 220/839, 220/4.23, 780, 669, 229, 675, 837, 793; 215/235, 215/228; 221/264, 263, 288, 289, 307, 310, 221/256, 255, 191, 194, 308, 309, 303, 306; 222/490–494, 517, 282; D9/447; 141/321; 206/828
See application file for complete search history.

(56) References Cited

U.S. PATENT DOCUMENTS 3,182,694 A 5/1965 Raimo
3,392,878 A * 7/1968 Jackson .................... 221/65

(Continued)

FOREIGN PATENT DOCUMENTS

GB 2345898 A 7/2000

(Continued)

OTHER PUBLICATIONS

European Patent Office, Communication with European Search Report in Application No. 09003288.9, dated Jun. 14, 2010.

(Continued)

*Primary Examiner* — Robin Hylton
(74) *Attorney, Agent, or Firm* — McAndrews, Held & Malloy, Ltd.

(57) ABSTRACT

A container useful for singly dispensing a tablet includes a leaf integrally formed with the sidewall and projecting generally radially inward to a distal portion. One or more such leaves define a dispensing opening having a smaller diameter than the mouth of the container. The leaves or other undercut structure can be formed using a mold element having a leading portion for forming a portion of the part beyond the resilient projection and a following portion for forming a portion of the sidewall short of the resilient projection. The following portion is withdrawn at least partially away from the outside surface of the resilient projection, leaving a space between the leading and following portions. The leading portion is withdrawn from the mold cavity against an undercut portion of the resilient projection, folding the resilient projection into the space left by retracting the following portion.

4 Claims, 4 Drawing Sheets

U.S. PATENT DOCUMENTS

| | | | | |
|---|---|---|---|---|
| 3,480,182 A | * | 11/1969 | Rigor | 221/288 |
| 4,014,450 A | * | 3/1977 | Girotti et al. | 220/4.24 |
| 4,530,447 A | * | 7/1985 | Greenspan | 221/288 |
| 4,653,668 A | * | 3/1987 | Gibilisco et al. | 221/298 |
| 5,911,937 A | | 6/1999 | Hekal | |
| 6,174,952 B1 | | 1/2001 | Hekal | |
| 6,527,140 B1 | * | 3/2003 | Thompson et al. | 221/292 |
| 7,306,127 B2 | * | 12/2007 | Eimer | 222/494 |
| 7,306,128 B2 | * | 12/2007 | Eimer | 222/494 |
| 7,628,292 B2 | * | 12/2009 | Lancesseur et al. | 221/267 |

FOREIGN PATENT DOCUMENTS

| | | |
|---|---|---|
| JP | 09-12064 | 1/1997 |

OTHER PUBLICATIONS

Japanese Patent Office, Notice of Reasons for Rejection, in Application No. 2006-534145, dated Aug. 10, 2010.

\* cited by examiner

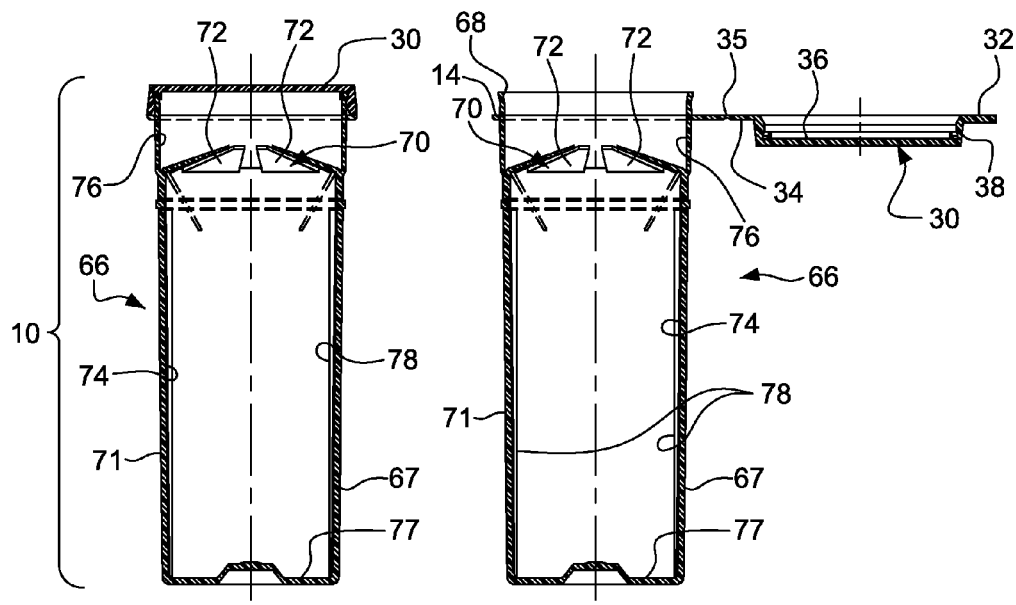
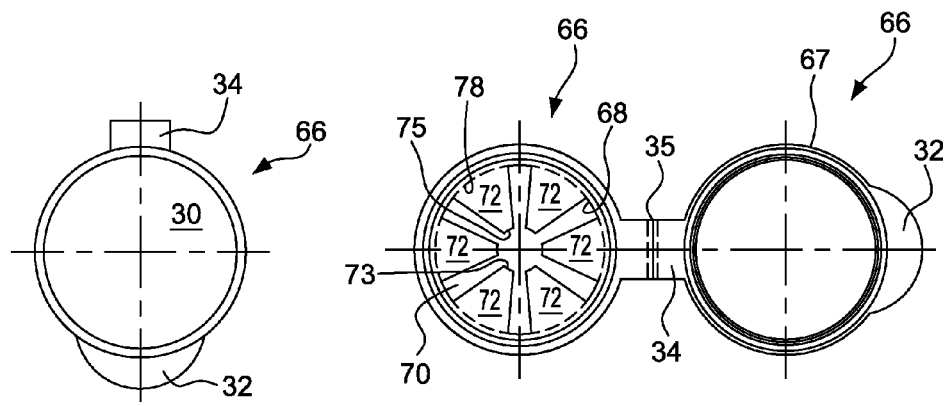
FIG. 1   FIG. 2
FIG. 3   FIG. 4

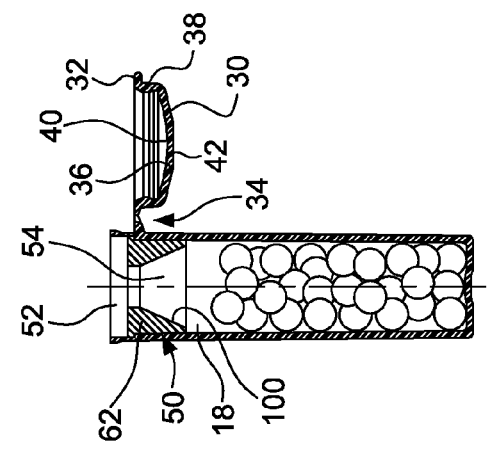
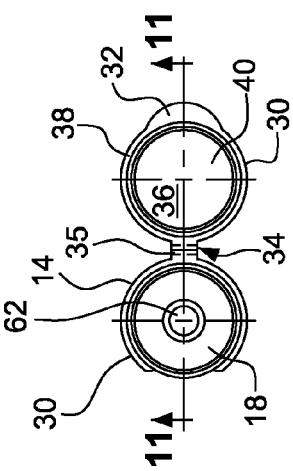
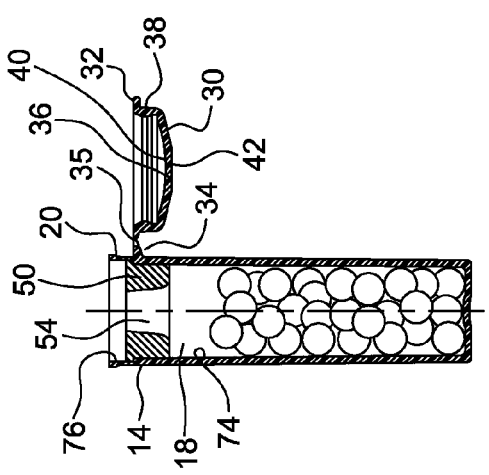
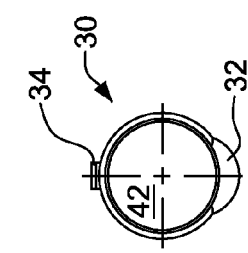
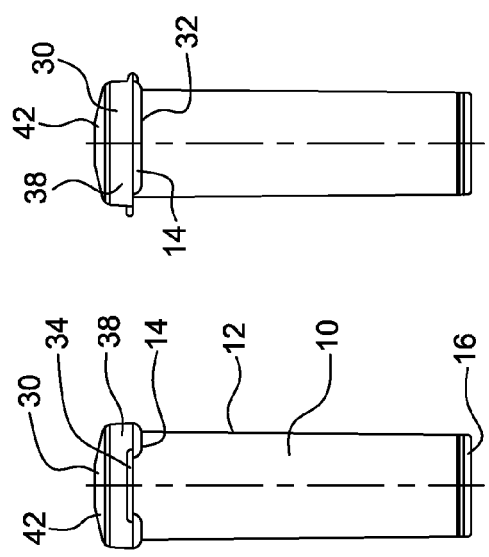

CONTAINERS WITH PILL DISPENSING FEATURE

RELATED APPLICATIONS

This application is a continuation-in-part of PCT application PCT/US2004/032369, filed Oct. 1, 2004, which claims priority to U.S. provisional application Ser. No. 60/508,183, entitled "Container with Pill Dispensing feature" by Jean-Pierre Giraud and John Belfance, filed Oct. 2, 2003, and to U.S. provisional application Ser. No. 60/510,888, entitled "One Piece Pill Dispenser Containing an Dispensing feature and Method Thereof" by Jean-Pierre Giraud, filed Oct. 14, 2003.

WO2005035391 is incorporated here by reference to provide continuity of disclosure.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to container systems with dispensing features for dispensing pieces of a material having uniform pieces. Several examples of such a material are a supply of tablets or pills, capsules, suppositories or the like of medicine; pieces of candy; natural materials such as grain, raisins, or rock salt; mechanical parts such as BBs or pellets; etc. Although dispensing tablets of medicine is used in this specification as an example, the present dispensing containers are not limited to any particular use.

Typically when opening a pill container, the pills can spill out of the container. Additionally, one can easily lose some of the pills. There is a need for improved containers for pills that administer only one pill at a time.

Therefore an improved container for medicines that prevents at least some of the pills from spilling out of the container when it is opened would be useful.

BRIEF SUMMARY OF THE INVENTION

Container assemblies are provided for storing and delivering pills, tablets, capsules, candy or other pieces of a material having uniform pieces. The container assembly includes a container, a cap and a dispensing feature. The container and cap may be formed as one piece connected by a hinge. The dispensing feature may be formed separately or as a part of the container. A process for making a molded container that includes an integral dispensing insert and cap is described. The dispensing feature is designed to dispense one pill, tablet or other shaped object at a time.

As one example of using the invention, the container assembly can be inverted while the cap is seated, and the container can be shaken to release one pill or tablet from the container, through the dispensing feature. The dispensed pill or tablet remains captured between the cap and top of the container until the cap is opened and the dispensed pill or tablet or other material is removed. Optionally the same method can be used to release or dispense two or more pills or tablets, as by passing a first pill or tablet through the dispensing feature, then passing a second pill or tablet without first removing the first dispensed pill or tablet. The container assembly may be tamper-proof and/or childproof.

Another aspect of the invention is a method of integrally forming a generally tubular structure having a sidewall defining a mouth, the sidewall having inside and outside surfaces, and at least one resilient projection integrally formed with and projecting generally radially inward from the inside surface of the sidewall and defining an undercut. One example of such a tubular structure is a container with a dispensing insert.

The method includes providing a mold cavity and a core for defining the generally tubular structure. The core has a leading portion for forming a portion of the sidewall further within the structure than the resilient projection and a following portion for forming a portion of the sidewall not as far within the structure as the resilient projection.

The core is inserted into the mold cavity, and moldable material is introduced into the cavity to integrally form the sidewall and resilient projection of the part being formed.

The following portion of the core is withdrawn at least partially away from the outside surface of the resilient projection, leaving a space between the leading and following portions of the core. The leading portion of the core is withdrawn from the mold cavity against an undercut portion of the resilient projection. This contact between the leading portion of the core and the undercut portion of the part folds the resilient projection into the space left by retracting the following portion of the core. The leading portion of the core is withdrawn further from the mold cavity past the resilient projection, thus allowing the resilient projection to unfold to a generally radially inwardly projecting position.

Yet another aspect of the invention is a mold for integrally forming a generally tubular structure having a sidewall defining a mouth, the sidewall having inside and outside surfaces, and at least one resilient projection, such as a leaf, integrally formed with and projecting generally radially inward from the inside surface of the sidewall and defining an undercut.

The mold has a mold cavity and a core for defining the generally tubular structure. The core or cavity has a leading portion for forming a portion of the sidewall further within the structure than the resilient projection and a following portion for forming a portion of the sidewall not as far within the structure as the resilient projection. The following portion is adapted to be withdrawn at least partially away from the leading portion, leaving a space between the leading and the following portions. The leading portion is adapted to be withdrawn from the mold cavity against an undercut portion of the resilient projection for folding the resilient projection into the space left by retracting the following portion. The leading portion is adapted to be further withdrawn from the mold cavity past the resilient projection, thus allowing the resilient projection to unfold to a generally radially projecting position.

BRIEF DESCRIPTION OF SEVERAL VIEWS OF THE DRAWINGS

FIGS. 1 and 2 are longitudinal sections of an embodiment of a container with a closed cap (FIG. 1) and open cap (FIG. 2), showing a petal like or leaved dispensing feature and a desiccant lining in the container.

FIGS. 3 and 4 are plan views of the closed cap (FIG. 3) and petal like dispensing feature (FIG. 4) of the container of FIGS. 1 and 2.

FIGS. 7 and 8 are rear and side elevations,

FIG. 9 is a plan view with the cap closed,

FIG. 10 is a plan view with the cap open,

FIG. 11 is a section taken along line 11-11 of FIG. 10, and

FIG. 12 is an isolated longitudinal section of the dispensing feature of another embodiment of the container assembly having a separately formed dispensing feature secured in its mouth.

FIG. 13 is a view similar to FIG. 11, showing another embodiment.

DETAILED DESCRIPTION OF THE INVENTION

Figure 6:
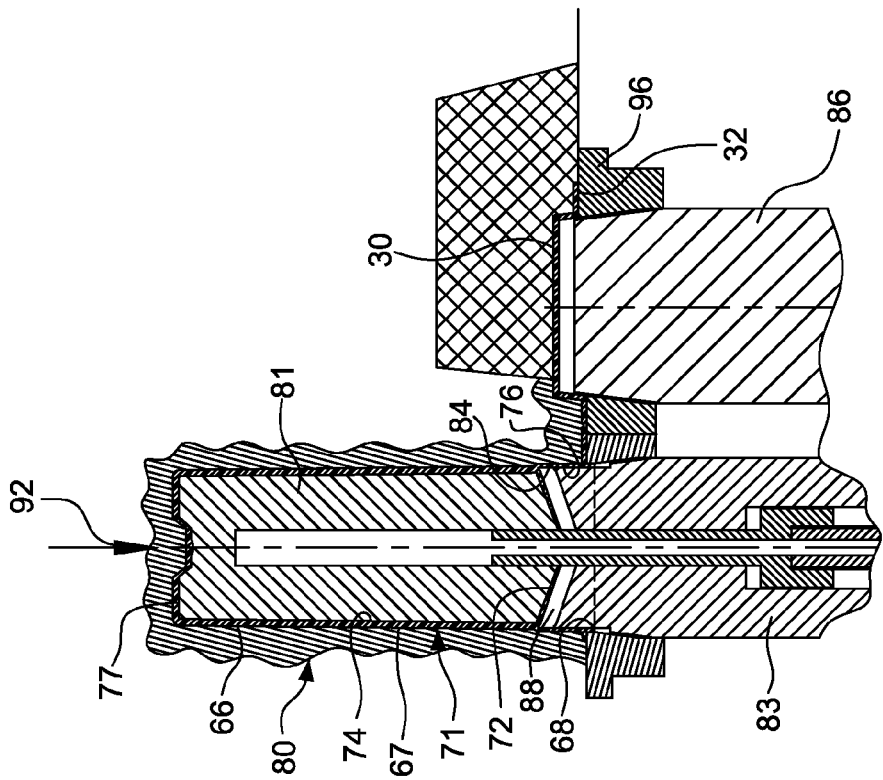
FIGS. 5 and 6 are sections of a mold useful for making the container of FIGS. 1-4 and other parts, showing the mold fully closed and empty in FIG. 5 and the short core and the following portion of the long core partially withdrawn, with the mold full, in FIG. 6.

As generally used here, "empty stage" refers to a stage when the container is empty prior to filling, such as when the container is shipped by the manufacturer of the container to the site where items are placed inside the container.

As generally used here, "filling stage" refers to a stage after the container has been filled with its content.

As generally used here, "tamper-proof seal" means a visual indication that: (a) when not broken, the container's cap has not been opened; and (b) when broken, the container cap has been opened and thus, visually displays that the container was tampered with.

The container may have any shape that is suitable for storing pills, tablets or other shaped objects. In the preferred embodiment, the container is in the shape of a cylinder. Typically, the container is closed at one end and is open at the opposite end. Optionally, when the container is closed, the container is moisture tight.

The cap is typically attached to the container by way of a hinge. The cap also has a mating sealing element that interfaces with the open end of the container, thereby forming a container and cap assembly.

The assembly is preferably molded of plastic. Suitable material for assembly includes plastics like thermoplastics such as polypropylene and polyethylene. The cap 30 and the container 10 may be integrally molded of plastic to form a hinge 34 there between. In another embodiment, the cap 30 and the container 10 may be produced in a conventional molding process.

The assembly may be produced in accordance with the operation disclosed in U.S. Pat. No. 4,783,056 to Abrams, RE37,676 to Abrams et al., or U.S. Pat. No. 6,303,064 to Abrams et al. The disclosures of these patents are incorporated here by reference.

Embodiments of the container are shown in FIGS. 1-5 and 7-13.

FIGS. 1-4 show an embodiment of the container assembly 10 for singly dispensing pieces of a material having uniform pieces. The assembly includes a vessel or container 66 having a sidewall 67 defining a mouth 68, the sidewall having outside and inside surfaces 71 and 74. The mouth 68 defines the "upper" portion of the container 66, although it will be understood that "upper" as used here does not require a particular orientation of the container relative to the environment. "Up" is defined here as close or closer to the mouth 68, and "down" as defined here as close or closer to the base 77 of the container, as though it were oriented upright with its mouth up and its base 77 down.

Referring in particular to FIGS. 2 and 4, a leaf, here a plurality of leaves 72, is integrally formed with the sidewall 67 and projects generally radially inward to a distal portion such as 73 (see FIG. 4). The distal portions such as 73 define a dispensing opening 75 having a smaller diameter than the mouth 68. In another embodiment, a leaf 72 could be provided having a distal portion cooperating with part of the inner sidewall 74 or other structure. The leaves 72 can be broad in relation to their thickness, as illustrated, or narrower, analogous to pine needles or bristles of a brush.

In FIGS. 1-4, circumferentially spaced leaves 72 are integrally formed with the sidewall 67 and project generally radially inward to distal portions 73 together defining a dispensing opening 75. In an embodiment, the leaves can be substantially the same size and shape, though other embodiments are also contemplated in which the leaves differ in size or shape or both. In this embodiment the leaves 72 define a frustoconical or inverted-funnel-shaped surface with a central opening defining the dispensing opening 75. "Project generally radially inward" as defined here allows the leaves to project perpendicular or exactly radially with respect to the sidewall 67, or at an angle other than perpendicular, so they extend axially as well as radially.

To facilitate molding the container and integral undercut leaves 72 as explained below without using expensive molding techniques such as lost-wax casting, the container 66 can have at least one radially outwardly extending step or recess 76 (see FIGS. 1 and 2), here one continuous recess going all the way around, in the inside 74 of the sidewall above the leaves 72. The leaves 72 of this embodiment are adapted to fold into the recess 76. In an embodiment, the leaves 72 are adapted to fold resiliently upward into the recess 76 responsive to a biasing force, then spring back to a generally radially inwardly extending position at least partially outside the recess 76 when the biasing force is at least partially removed.

Thus, the dispensing feature 70 is configured in the shape of a petal defined by solid leaves 72. The profile of the container's inner sidewall 74 is designed with a step 76 above the petals to accommodate the opening of the petals during the mold opening cycle. This step 76 along the inner sidewall 74 can be approximately equal to the thickness of the petal leaves 72, or greater than that thickness.

Additional features contemplated for the embodiment of FIGS. 1-4 are described in connection with FIGS. 7-13.

Figure 5:
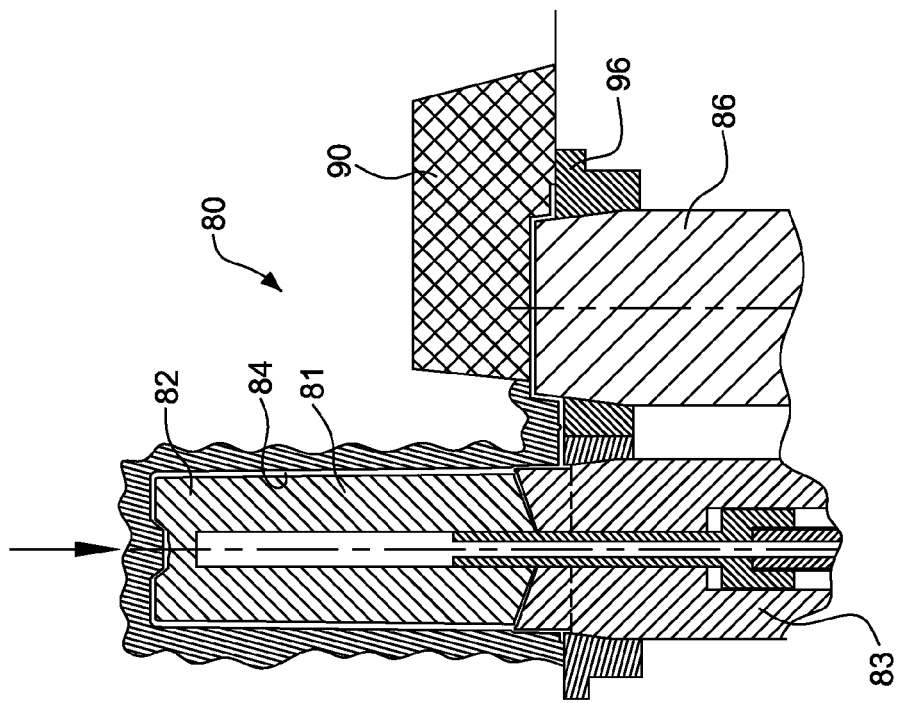
Figure 14:
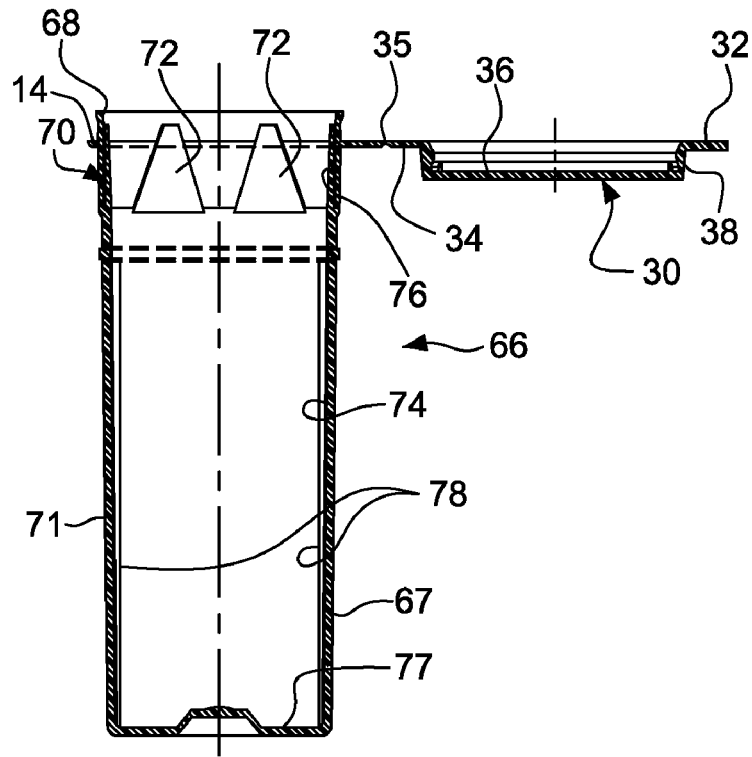
FIG. 14 is a view like FIG. 1.
Figure 15:
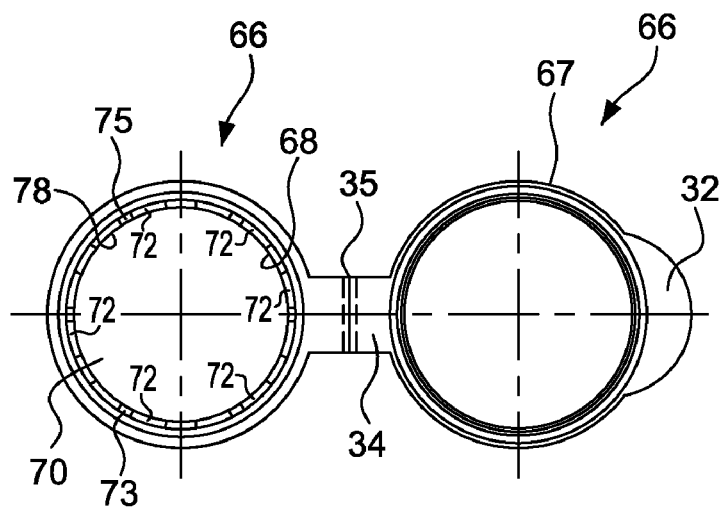
FIG. 15 is a fragmentary view like FIG. 4, but showing the leaves 72 folded into the recess 76.

FIGS. 5 and 6 show a mold and method for forming parts having undercut structure, such as the container 66 of FIGS. 1-4 having undercut leaves 72. More generally FIGS. 5 and 6 show a method of integrally forming a structure such as 66 having at least one resilient projection integrally formed with and projecting generally radially inward or outward from the body of the container and defining an undercut.

In an embodiment, the container assembly with the dispensing feature is manufactured in a single molding cycle and made out of one piece (no assembly in the mold or afterward). The advantages of a single molding process include manufacturing in a completely sterile process, which is preferred for pharmaceutical applications.

FIG. 5 shows the mold fully closed and empty of moldable material, as would be the state of an injection mold just before a charge of plastic or other moldable material is introduced (note that the invention is not limited to injection molding, however: in other types of molding the material to be molded may be introduced before the mold is closed). FIG. 6 shows the mold after the moldable material has been introduced and formed into a part, and a portion of the core has been partially withdrawn from the part, as further explained below.

As shown in FIGS. 5 and 6, in an embodiment, the mold 80 includes a two-part long core 82, including a leading portion 81 and a following portion 83, insertable in a cavity 84. In an embodiment, in which the container includes an integral cap 30, as shown in FIGS. 1-4 and 6, the mold 80 further includes a short core 86 for forming the cap 30. Conventionally, the cores 82 and 86 at least primarily form interior portions of the container and cap, while the cavity 84 at least primarily forms exterior portions of the container and cap.

In the illustrated method, the core 82 has a leading portion 81 for forming a portion of the sidewall further within the structure than the leaf 72 or other resilient undercut structure and a following portion 83 for forming a portion of the sidewall not as far within the structure as the leaf. In an embodiment, the leading portion 81 and following portion 83 of the long core 82 form the dispensing feature 70, for example the petals 72, between them along the container's inner side walls 74.

To mold the part, the core is fully inserted into the cavity to define the as-molded shape of the part. Before, during, or after insertion of the core, moldable material is introduced into the mold cavity, as by injection, to integrally form the sidewall and leaf or other resilient undercut feature. During the injection cycle, the petal leaves 72 of the dispensing feature 70 are filled from the container's sidewalls 74. A part 66 is formed, as shown in FIG. 6, having the shape of the fully closed mold as shown in FIG. 5.

To release the part 66 from the mold, a following portion 83 of the core 82 is withdrawn at least partially away from the outside surface of the resilient undercut portion such as the leaf 72, as illustrated in FIG. 6, leaving a space 88 between at least a portion of the leaf 72 and a following portion 83 of the core 82. The space 88 is provided to allow room for the leaf 72 to fold toward the mouth 68 of the part 66. In this embodiment, withdrawing the entire core 82 from the mold without allowing for a space 88 to be formed would tend to shear off the leaf 72, breaking the part 66. If, however, the leaf 72 is sufficiently flexible, it is not essential to leave a space 88. It also is not essential for the space 88 to be as long axially as the extent to which the leaf 72 must swing to fully enter the recess or step 76.

Further, the necessary flexibility of the leaf 72 or other undercut structure is its flexibility at the time it is folded. If the leaf 72 is not fully hardened, as because it remains at an elevated temperature or (in the case of a thermoset part) not fully cured at the time the leaf 72 is folded, it may be more flexible then than after the part has fully hardened. Providing an undercut structure that is more flexible at the time of its removal from the mold than later facilitates its removal from the mold without requiring the final part to be as flexible in use.

Next, a leading portion 82 of the core is withdrawn from the mold cavity 84 against an undercut portion of the leaf 72 or other structure, thus folding the leaf 72 against the sidewall 74. This folding step effectively temporarily removes or reduces the undercut while the leading portion 82 is in contact with the leaf 72. In an embodiment, the leaf 72 can be thin enough or the sidewall 74 can deflect outward sufficiently to pass the leading portion 82 without damaging the part. Deflection of the sidewall forms a recess in the sidewall 74 temporarily.

In the illustrated embodiment, a recess or step 76 is molded permanently into the container 66 by the shape of the corresponding part of the following portion 83 of the core 82. At least part of the following portion 83 projects further radially outward than the corresponding part of the leading portion of the core, providing the inner surface of the sidewall 74 with a recess or step 76 positioned radially outside the circumferentially corresponding leading portion of the core for receiving the leaf 72 when withdrawing the leading portion 81 of the core 82 past the leaf 72.

A leading portion 82 of the core is then further withdrawn from the mold cavity past the leaf 72, optionally far enough to be entirely out of contact with the leaf 72, thus allowing the leaf 72 to unfold to a generally radially inwardly projecting position, as shown in FIGS. 1-4 and 6.

In an embodiment, the leading and following portions 81 and 83 of the core define between them a cavity shaped to form the leaf 72. The following surface of the leading portion 81 defines the inner or lower surfaces of the leaf 72. The leading surface of the following portion 83 defines the outer or upper surfaces of the leaf 72.

As noted above and shown in FIGS. 1 and 2, the container inner sidewall 74 is designed with a step 76 above the petal leaves 72 to accommodate the opening of the petal leaves 72 during the mold opening cycle. The depth of this step 76 along the inner sidewall 74 can be approximately equal to the thickness of the petal leaves 72. The opened dispensing feature 70 permits the long core 82 to exit through the dispensing feature 70 without damaging the petal leaves 72. Once the mold 80 is fully retracted, in an embodiment, the petal leaves 72 return to a position projecting generally radially inward from the container sidewalls 74.

It will be understood from the foregoing description that the undercut part could also project radially outward from the outer surface of a cylindrical or tubular part, and the recess allowing the mold to pass can be formed in the outer wall of the part. In this modification the leading and following portions 81 and 83 could be part of a cavity instead of a core.

In a further embodiment, the mold 80 may also incorporate one or more of the following mold features: (1) a short core with an active flipper 90 to close the cap in the mold; (2) the injection point 92 at the bottom of the container; (3) a stripper plate 96; and/or (4) a mold design to accommodate an in-mold liner 78 of desiccant entrained plastic along the inner walls. The container with desiccant lining 78 is shown in FIGS. 1, 2, and 4.

In an embodiment, the leaves 72 can be assisted in returning to defined positions, after the core is removed, by inserting a tool against them to push them back into position. This tool can be combined with a tool for filling the container, also described above.

The cap and dispensing feature assembly shown in FIGS. 7-11 includes a container 10 having a base 16, an internal cavity 18, an outer surface 12, and an upper portion including a partial flange 14. The partial flange 14 extends radially outwardly from the outer surface 12 of the container 10. The container 10 has a rim 20 at the top of the upper portion.

The container may be of a sufficient size to store for example, 10 to 200 pills, tablets or other shaped objects, optionally less than 150, optionally less than 100 or less than 50. The pills or objects optionally range in size from about 2 mm to about 20 mm in diameter, optionally from about 4 mm to about 9 mm in size. The size of the pills, tablets or other shaped objects optionally is approximately equivalent to the size of the hole in the dispensing feature. Although depicted as a cylindrical container, it is understood that the container could be made in a variety of container assembly designs, including but not limited to designs having non-cylindrical container assembly shapes.

Optionally, the container of any embodiment includes a lining of a material that absorbs or releases materials, as discussed above with respect to FIGS. 1 and 2.

As an example, if the material absorbs water vapor, the lining may be included to keep the contents at a low relative humidity since any moisture that permeates through the seal or is present in the container might be absorbed.

The lining material may be a desiccant entrained plastic. Suitable desiccant plastics include, but are not limited to those disclosed in U.S. Pat. Nos. 5,911,937; 6,214,255; 6,130,263; 6,080,350; 6,174,952; 6,124,006; 6,221,446; and 6,486,231, all to Hekal. The disclosures of these patents are incorporated here by reference. By varying the desiccant loading and channeling agent in the plastic formulation, the overall moisture capacity and uptake rate of the desiccant entrained plastic can be controlled. The plastic may be entrained with other absorbing, releasing or activation components.

The lining may release a gas, such as an inert gas that prevents oxidation of the enclosed medicament, a flavoring or fragrance, or moisture, in the case of a medicament that should not be allowed to dry out. U.S. Pat. Nos. 6,174,952; 6,177,183; 6,194,079; 6,316,520; 6,124,006; 6,221,446; and 6,486,231 describe these kinds of arrangements and are incorporated here by reference.

In an embodiment, the desiccant entrained plastic is located in a desiccant sleeve, which surrounds at least a portion of the product within the container. In yet another embodiment, the sleeve surrounds the container assembly interior with a thin-walled plastic so that the product contained within the container assembly is completely surrounded by the desiccant entrained plastic sleeve. The items contained in the container may be exposed to about 2% as much moisture when compared to items stored in a conventional capped container.

Returning to FIGS. 7-12, the assembly includes a cap 30, which has a solid base 36 and a tubular skirt 38 extending perpendicularly and outwardly around the outer periphery of the base 36. The cap 30 is typically attached to the container 10 by a hinge 34. The cap 30 has a tab 32 for facilitating the opening and closing of the container 10 at the end opposite the hinge 34. The tab 32 extends perpendicularly and outwardly from the skirt of the cap 38. The container 10 also has a partial flange 14 extending radially outwardly from the outer surface 12 of the container 10 and ending where a thumb tab 32 of cap 30 comes in contact with the container 10. The hinge 34 has a recess 35 that functions as a binding point for ease of opening and closing of the container 10. Optionally, the hinge 34 is attached to the container at or near the container flange 14. The cap 30 seats on the rim 20 to seal the dispenser opening.

While the figures depict the hinge 34 as integral with the cap 30 and container 10, the skilled person will readily appreciate that any kind of hinge may be employed, and that a hinge is not required. In an embodiment, the hinge is formed from a plurality of components. For example, a hinge component attached to the cap may be engaged with a hinge component attached to the container. In another embodiment, the container and cap are joined together by a hinge. In this embodiment, the container assembly is an interconnected assembly in which the cap is opened and closed in a "flip-top" arrangement. Alternatively, the hinge is integral with the cap and container, which provides a one-piece container assembly.

The container assembly may contain an "easy-to-close" cap design, in which the container assembly is specifically designed to be in one of only two states: (1) open or (2) completely closed. The closure arrangement is designed so that the cap cannot be partially closed or crooked, relative to the container. If the cap does not seal properly, it will pop up to the open position.

Optionally, the cap is designed so it can be closed with one hand.

Thus, the assembly can be arranged so the user can close the cap from any position with respect to the hinge (front, side or back of container assembly). U.S. Pat. No. 6,769,558 to Bucholtz describes this arrangement and is incorporated here by reference.

In yet another embodiment, the container assembly maintains seal performance, such as a low ingression rate, after repeated lid openings/closings. In one specific example, the seal maintains its low moisture ingress performance after 50 cycles of lid openings and closings. U.S. Pat. Nos. 4,812,116; 4,807,425; 5,723,085; and 6,769,558, and European patent document no. EP 0 625 948 to Capitol Vial Inc., describe examples of embodiments of this sealing arrangement. The disclosures of these patents are incorporated here by reference.

FIGS. 11-12 show a dispensing feature 50 which optionally can be formed as a separate part and inserted into the container 10 to regulate the dispensation of the contents of the container 10. The dispensing feature 50 has a hole 52 for dispensing pills, tablets or other shaped objects. The hole 52 can be sized so that one pill, tablet, capsule, candy or other shaped object can fit through the hole 52 at a time. The dispensing feature 50 can be of any shape that fits inside of the container 10. In an embodiment the dispensing feature 50 is round. The dispensing feature 50 may have an outer diameter that is slightly larger than the inner diameter of the container 10 so that the dispensing feature 50 fits snugly in the upper portion of the container. If the container wall 74 has a recess 76, the dispensing feature 50 can have a flange 99 that lodges in the recess 76 to prevent the dispensing feature 50 from being inserted further into the container than as shown in FIGS. 11-13

The dispensing feature 50 may be maintained in the upper portion of the container by a pressure fit or friction fit. Alternatively, the dispensing feature 50 has a diameter that is slightly smaller than the inner diameter of the container. In this embodiment, the dispensing feature 50 is secured by a suitable fixation means, such as an adhesive or welding.

In an embodiment, the hole 52 has a diameter that is substantially equivalent to the size of the pill, tablet or other shaped object so that when the cap 30 is closed, the container assembly 10 must be shaken to dispense one object through the dispensing feature 50 and into the collar 62 (e.g. by turning the container 10 upside down).

In yet another embodiment, the collar 62 works in conjunction with the dispensing feature 50 to dispense one object into the closed cap. Thus, collar 62 is sized so that collar 62 can work with the dispensing feature 50. Subsequently, cap 62 is removed and the object is presented on the dispensing feature 50 for removal.

FIG. 13 illustrates another example of a dispensing feature 50 having a hole 54. The hole 54 has a double frusto-conical or asymmetric hourglass shape, with a larger diameter facing into the container than facing out, so that a pill can be dispensed from the container 10 but will not so easily move back into the container 10.

In the example shown in FIG. 11, the dispensing feature 50 has a generally flat upper surface that is recessed into the mouth 68, leaving a space above the dispensing feature 50 and within the cap 30 when the container is closed. A pill dispensed through the dispensing feature 50 when the container is closed will remain in the dispensing area, i.e. the area above the dispensing feature 50 and beneath the cap 30. It is understood that other geometries of the top and bottom portion and hole may be used to achieve the result of dispensing the object from the container and holding the object in the dispensing area.

In yet another embodiment, a child resistant feature may be incorporated into the container assembly. An example of such an arrangement is disclosed in pending U.S. patent application Ser. No. 09/641,203, filed Oct. 3, 2000, which is incorporated here by reference.

A tamper evidence feature that is molded into the container assembly may be employed. Shrink-wrap may be used to cover the cap and all or a portion of the container. Alternatively, a two-position, breakaway tab may be used. An example of the two-position, breakaway tab is disclosed in U.S. Pat. No. 6,398,067 to Belfance and Supranowicz, the disclosures of which are incorporated here by reference. The tab is engaged during container assembly filling, and the tab is ejected from the container assembly when first opened by the user. Evidence of tampering with the container is apparent from the broken tab. It will be appreciated that it may not be possible to replace the tab once it has broken, since the tab is formed integrally with the container. Therefore, it should not be possible to defeat the tamper-proof capabilities. It will also be appreciated that the interlocked tab may also aid in preventing dislodgement of the cap during transport.

The cap 30 has a base 36 with a skirt 38 extending perpendicularly and outwardly around the outer periphery of the base 36. The cap 30 has a hinge 34 and a thumb tab 32 extending perpendicularly and outwardly from the skirt 38 of the cap, as described above with reference to FIGS. 1 and 2.

A tamper evidence feature optionally can be molded into the container assembly. An example is achieved with a two-position, breakaway tab that is disclosed in U.S. Pat. No. 6,398,067, incorporated here by reference. The tab is engaged during container assembly filling, and the tab is ejected from the container assembly when first opened by the user.

In operation, the container 10 is filled with the desired shaped object and then, after filling, the dispensing feature 50 is inserted into container 10. Subsequently, the cap 30 is fitted onto the container 10 to form a final product. In the embodiment of FIGS. 1-4, a tool such as a dispensing spout or funnel can be forced past the leaves 72, which are present in the as-molded container, to enable the package to be filled easily.

The container assembly can store a number of pills, tablets or other shaped objects, including items that require storage in a moisture-free environment. For example, stored objects may be candy, pharmaceutical products, and/or vitamins. The tables may be effervescent tablets.

When in the closed position, the container assembly can be inverted and shaken to release one pill or tablet from the container, through the dispensing feature. The pill or tablet will remain in the area between the cap and top of the container. This dispensing operation can be repeated before removing the first pill, thus dispensing a dose of two or more pills that can be removed together.

Those skilled in the art will recognize, or be able to ascertain using no more than routine experimentation, many equivalents to the specific embodiments of the invention described here. The following claims encompass such equivalents.

The invention claimed is:

1. A container assembly useful for singly dispensing an article from a supply of uniform articles, the assembly comprising:
   a vessel having a sidewall and a closed base, the sidewall defining a mouth, the mouth and the closed base positioned at opposite ends of the vessel, the sidewall having inside and outside surfaces;
   plural, circumferentially spaced leaves integrally formed with the sidewall and projecting generally radially inward and axially toward the mouth to distal portions defining a dispensing opening having a smaller diameter than the mouth; and
   at least one radially outwardly extending recess in the sidewall axially between the leaves and the mouth, wherein the plural, circumferentially spaced leaves are sufficiently flexible to fold into the recess.

2. The assembly of claim 1, where the leaves are substantially the same size and shape.

3. The assembly of claim 1, where the leaves define a frustoconical surface with a central opening defining the dispensing opening.

4. A container assembly useful for singly dispensing an article from a supply of uniform articles, the assembly comprising:
   a vessel having a sidewall and a closed base, the sidewall defining a mouth, the mouth and the closed base positioned at opposite ends of the vessel, the sidewall having inside and outside surfaces;
   plural, circumferentially spaced leaves integrally formed with the sidewall and projecting generally radially inward and axially toward the mouth to distal portions defining a dispensing opening having a smaller diameter than the mouth; and
   at least one radially outwardly extending recess in the sidewall axially between the leaves and the mouth, wherein the plural, circumferentially spaced leaves are sufficiently flexible to fold into the recess,
   wherein the leaves are sufficiently flexible and resilient to fold resiliently into the at least one recess responsive to a biasing force, then spring back to a generally radially inwardly extending position at least partially outside the at least one recess when the biasing force is at least partially removed.

\* \* \* \* \*

UNITED STATES PATENT AND TRADEMARK OFFICE
CERTIFICATE OF CORRECTION

| | | Page 1 of 1 |
|---|---|---|
| PATENT NO. | : 8,322,567 B2 | |
| APPLICATION NO. | : 11/397073 | |
| DATED | : December 4, 2012 | |
| INVENTOR(S) | : Giraud et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1201 days.

Signed and Sealed this

Second Day of December, 2014

Michelle K. Lee
*Deputy Director of the United States Patent and Trademark Office*